(12) United States Patent
Bolling

(10) Patent No.: US 9,913,199 B1
(45) Date of Patent: Mar. 6, 2018

(54) PROVIDING COMMUNICATION OVER A PLURALITY OF NETWORKS

(71) Applicant: GE Aviation Systems LLC, Grand Rapids, MI (US)

(72) Inventor: Randy E. Bolling, Odessa, FL (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 15/634,030

(22) Filed: Jun. 27, 2017

(51) Int. Cl.
H04W 40/00 (2009.01)
H04W 40/34 (2009.01)
H04W 72/12 (2009.01)
G08G 5/00 (2006.01)

(52) U.S. Cl.
CPC ....... *H04W 40/34* (2013.01); *H04W 72/1242* (2013.01); *G08G 5/0013* (2013.01)

(58) Field of Classification Search
CPC . H04W 40/34; H04W 72/1242; G08G 5/0013
See application file for complete search history.

(56) References Cited

U.S. PATENT DOCUMENTS

| 5,809,402 | A | 9/1998 | Lemme | |
|---|---|---|---|---|
| 6,522,655 | B1 * | 2/2003 | Laiho | H04W 76/02 370/352 |
| 7,796,954 | B2 | 9/2010 | Whitaker Filho | |
| 8,121,140 | B2 | 2/2012 | McGuffin et al. | |
| 8,284,674 | B2 | 10/2012 | True et al. | |
| 8,433,817 | B2 | 4/2013 | Tamalet et al. | |
| 9,503,175 | B2 | 11/2016 | Judd et al. | |
| 9,515,721 | B2 | 12/2016 | Horvitz et al. | |
| 2007/0143502 | A1 * | 6/2007 | Garcia-Martin | H04L 67/26 709/246 |
| 2009/0058682 | A1 | 3/2009 | True | |
| 2010/0278075 | A1 * | 11/2010 | Ikeda | H04L 41/12 370/254 |
| 2011/0225260 | A1 * | 9/2011 | Kalhous | B60H 1/00657 709/217 |
| 2014/0380433 | A1 | 12/2014 | Yerger et al. | |
| 2015/0025791 | A1 * | 1/2015 | Huth | G01C 21/3492 701/423 |
| 2017/0026797 | A1 * | 1/2017 | Venkataraman | H04W 4/023 |
| 2017/0160401 | A1 * | 6/2017 | Lei | G01S 19/51 |
| 2017/0197583 | A1 * | 7/2017 | Izraeli | B60R 25/102 |
| 2017/0288951 | A1 * | 10/2017 | Kurauchi | H04L 41/0668 |

* cited by examiner

*Primary Examiner* — Dominic Rego
(74) *Attorney, Agent, or Firm* — GE Aviation Patent Operation; William S. Munnerlyn

(57) ABSTRACT

One example aspect of the present disclosure relates to a method for providing communication over a plurality of networks. The method can include intercepting a message from a communication management unit located on a vehicle to a first transmitter located on the vehicle, wherein the communication management unit is configured to manage communications over the first network, and wherein the first transmitter is configured to communicate over the first network. The method can include initiating a communication session with the first transmitter and a second transmitter located on the vehicle, wherein the second transmitter is configured to communicate over a second network. The method can include routing the message among the first transmitter and the second transmitter, wherein the communication management unit is unaware of the second transmitter.

20 Claims, 10 Drawing Sheets

PROVIDING COMMUNICATION OVER A PLURALITY OF NETWORKS

FIELD

The present subject matter relates generally to aerial vehicles.

BACKGROUND

A communication management unit (CMU) of an aerial vehicle can be in direct communication with two or more transmitters. For example, the two or more transmitters can include a satellite communications (SATCOM) transmitter, a very high frequency (VHF) transmitter, and/or a high frequency (HF) transmitter. The CMU can facilitate communication over a plurality of networks. It can be desirable to add more transmitters, such as a cellular transmitter. However, adding another transmitter can require modification of the CMU.

BRIEF DESCRIPTION

Aspects and advantages of embodiments of the present disclosure will be set forth in part in the following description, or may be learned from the description, or may be learned through practice of the embodiments.

One example aspect of the present disclosure relates to a system for providing communication over a plurality of networks. The system includes a first transmitter located on a vehicle configured to communicate over a first network. The system includes a second transmitter located on the vehicle configured to communicate over a second network. The system includes a communication management unit located on the vehicle configured to manage communications over the first network. The system includes an interceptor unit located on the vehicle. The interceptor unit includes one or more processors. The one or more processors are configured to intercept a message from the communication management unit. The one or more processors are configured to initiate a communication session with the first transmitter and the second transmitter. The one or more processors are configured to route the message among the first transmitter and the second transmitter, wherein the communication management unit is unaware of the second transmitter.

Another example aspect of the present disclosure relates to a method for providing communication over a plurality of networks. The method can include intercepting a message from a communication management unit located on a vehicle to a first transmitter located on the vehicle, wherein the communication management unit is configured to manage communications over the first network, and wherein the first transmitter is configured to communicate over the first network. The method can include initiating a communication session with the first transmitter and a second transmitter located on the vehicle, wherein the second transmitter is configured to communicate over a second network. The method can include routing the message among the first transmitter and the second transmitter, wherein the communication management unit is unaware of the second transmitter.

Other example aspects of the present disclosure are directed to systems, methods, aerial vehicles, avionics systems, devices, non-transitory computer-readable media for facilitating communication over a plurality of networks.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
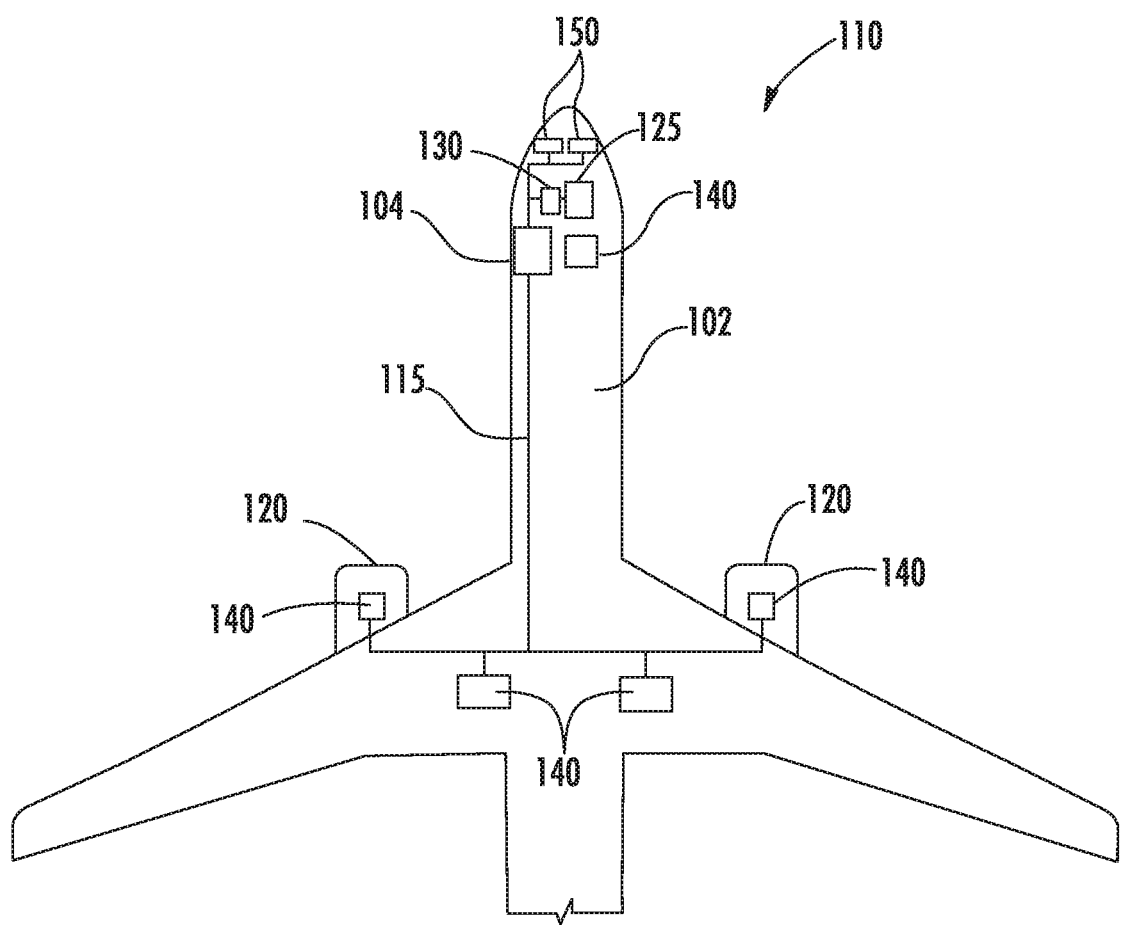
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

An aerial vehicle can include a plurality of transmitters (e.g., transceivers, radios, etc.) for communicating over a plurality of networks. Each transmitter can correspond to a network. The aerial vehicle can include a communication management unit (CMU). The CMU can facilitate message transmission via the plurality of transmitters. In an embodiment, the CMU can select a most efficient transmission method for a message. In an embodiment, the CMU can determine if a network is currently available.

According to example aspects of the present disclosure, one or more computing devices can be inserted in between the CMU and the two or more transmitters. The one or more computing devices can receive a plurality of signals from the two or more transmitters indicative of network conditions. The one or more computing devices can provide the plurality of signals to the CMU. The CMU can designate one of the two or more transmitters for transmitting the message based at least in part on the plurality of signals. The CMU can transmit the message on a port reserved for the designated transmitter.

The one or more computing devices can receive the message via the designated port. The one or more computing devices can determine an attempt by the CMU to transmit the message via the designated transmitter. In an embodiment, the one or more computing devices can transmit the message via the designated transmitter. In some embodiments, the one or more computing devices can designate an alternate transmitter based at least in part on signals received from the two or more transmitters.

In some embodiments, the CMU can be aware of a number of the two or more transmitters. For example, the CMU can be aware of three of the transmitters. In an embodiment, the one or more computing devices can be in communication with a higher number of the two or more transmitters. For example, the CMU can be in communication with five transmitters. In an embodiment, the one or more computing devices can consider if it is appropriate to transmit a message via any transmitters of which the CMU is unaware. Additionally, the CMU can determine if it is appropriate to queue a message for later transmission. For example, it can be desirable to wait until a more reliable network is available. As another example, an air traffic control message can need immediate dissemination.

In this way, the systems and methods according to example aspects of the present disclosure can have a number of technical effects and benefits. For instance, example aspects of the present disclosure have a technical effect of making computational resources agile by allowing them to accommodate adding additional transmitters to an aerial vehicle without altering existing computational resources.

In some embodiments, the systems and methods of the present disclosure also provide an improvement to a computation system. For example, the systems and methods can include a first transmitter located on a vehicle configured to communicate over a first network; a second transmitter located on the vehicle configured to communicate over a second network; a communication management unit located on the vehicle configured to manage communications over the first network; and an interceptor unit located on the vehicle comprising one or more processors configured to: intercept a message from the communication management unit; initiate a communication session with the first transmitter and the second transmitter; and route the message among the first transmitter and the second transmitter, wherein the communication management unit is unaware of the second transmitter. This can reduce a need to modify existing computational resources needed to accommodate additional transmitters added to an aerial vehicle.

FIG. 1 depicts an example system for providing communication over a plurality of networks according to example embodiments of the present disclosure. As shown, the system can include an aerial vehicle 102. The aerial vehicle 102 can include an onboard computing system 110. As shown in FIG. 1, the onboard computing system 110 can include one or more onboard computing device(s) 104 that can be associated with, for instance, an avionics system. The onboard computing device(s) 104 can be coupled to a variety of systems on the aerial vehicle 102 over a communications network 115. The communications network 115 can include a data bus or combination of wired and/or wireless communication links.

The onboard computing device(s) 104 can be in communication with a display system 125 including one or more display device(s) that can be configured to display or otherwise provide information generated or received by the system 110 to flight crew members of the aerial vehicle 102. The display system 125 can include a primary flight display, a multipurpose control display unit, or other suitable flight displays commonly included within a cockpit of the aerial vehicle 102.

The onboard computing device(s) 104 can also be in communication with a flight control computer 130. The flight control computer 130 can, among other things, automate the tasks of piloting and tracking the flight plan of the aerial vehicle 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aerial vehicle 102. The flight control computer 130 is illustrated as being separate from the onboard computing device(s) 104. Those of ordinary skill in the art, using the disclosures provided herein, will understand that the flight control computer 130 can also be included with or implemented by the onboard computing device(s) 104.

The onboard computing device(s) 104 can also be in communication with one or more aerial vehicle control system(s) 140. The aerial vehicle control system(s) 140 can be configured to perform various aerial vehicle operations and control various settings and parameters associated with the aerial vehicle 102. For instance, the aerial vehicle control system(s) 140 can be associated with one or more engine(s) 120 and/or other components of the aerial vehicle 102. The aerial vehicle control system(s) 140 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, and other systems.

Any or all of the onboard computing system 110, the on board computing device(s) 104, the flight control computer, and the aerial vehicle control system(s) 140 can include and/or be in communication with a communication management unit (CMU). The CMU can be in communication with one or more computing devices, such as the control device in FIG. 9. The one or more computing devices can be in communication with two or more transmitters 150. The CMU can transmit a message to a particular transmitter 150. The one or more computing devices can receive the message via a port associated with the particular transmitter 150. The one or more computing devices can determine a priority of the message. The determined priority of the message can determine when the message should be transmitted. The determined priority of the message can determine if the message should be transmitted using the particular transmitter 150 or if the one or more computing devices should select another transmitter 150 to transmit the message.

The numbers, locations, and/or orientations of the components of example aerial vehicle 102 are for purposes of illustration and discussion and are not intended to be limiting. Those of ordinary skill in the art, using the disclosures provided herein, shall understand that the numbers, locations, and/or orientations of the components of the aerial vehicle 102 can be adjusted without deviating from the scope of the present disclosure.

Figure 2:
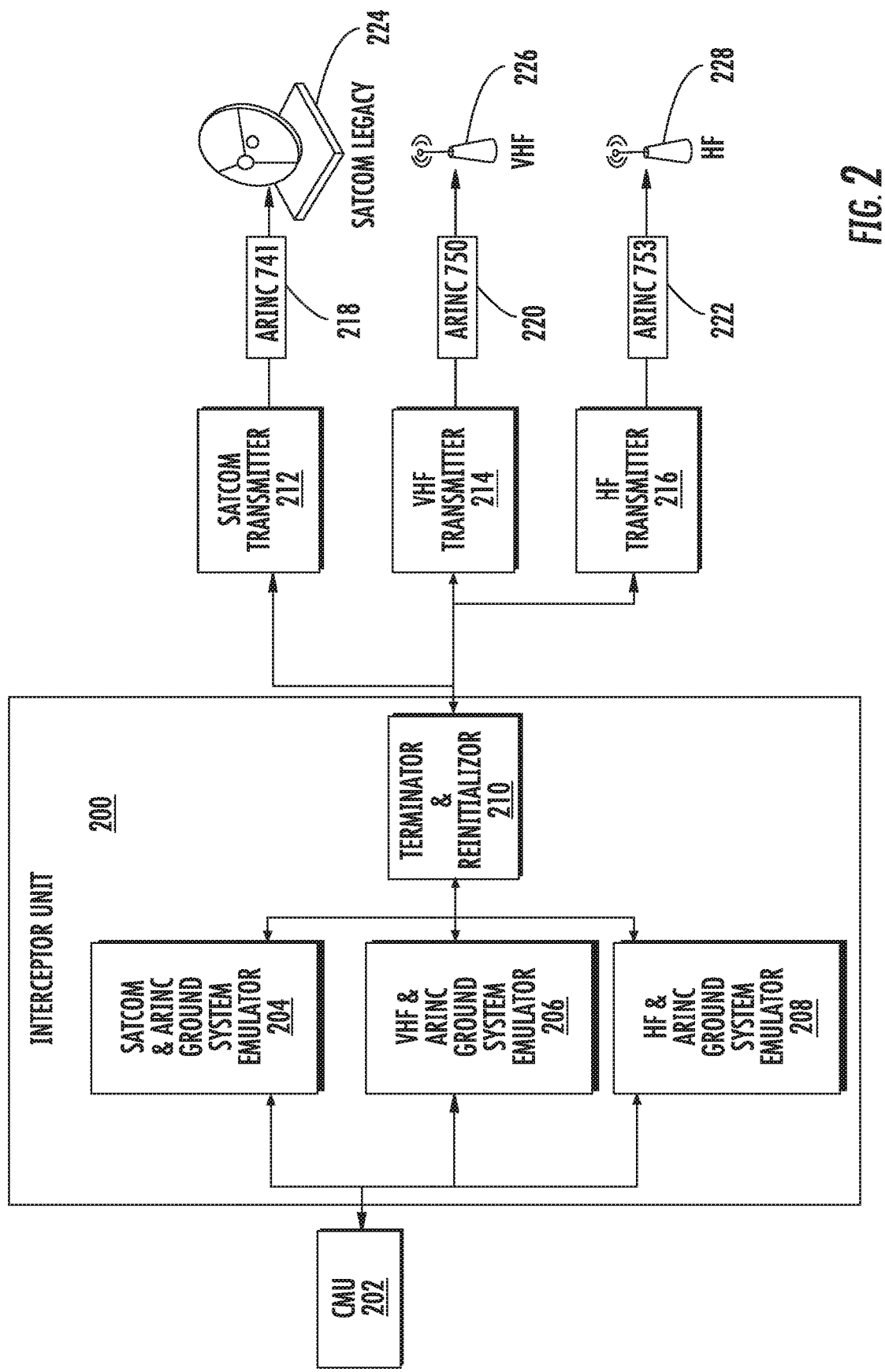
FIG. 2 depicts a block diagram according to example embodiments of the present disclosure.

FIG. 2 depicts a block diagram according to example embodiments of the present disclosure. A communication management unit (CMU) 202 can generate and/or transmit a message to a port associated with a particular transmitter. For example, a first port can be associated with a satellite communications (SATCOM) transmitter 212, a second port can be associated with a very high frequency (VHF) transmitter 214, and a third port can be associated with a high frequency (HF) transmitter 216. An interceptor unit 200 can intercept messages from the CMU 202 to the transmitters, such as the SATCOM transmitter 212, the VHF transmitter 214, or the HF transmitter 216. The interceptor unit 200 can include a SATCOM emulator 204, a VHF emulator 206, a HF emulator 208, and one or more aeronautical radio, incorporated (ARINC) ground system emulators. The SATCOM emulator 204 can be and/or include software that behaves like the SATCOM transmitter 212 from a perspective of the CMU 202. The VHF emulator 206 can be and/or include software that behaves like the VHF transmitter 214 from a perspective of the CMU 202. The HF emulator 208 can be and/or include software that behaves like the HF transmitter 216 from a perspective of the CMU 202. The one or more ARINC ground system emulators be and/or include software that behaves like an ARINC ground system from a perspective of the CMU 202.

A message sent to the first port can be received by the SATCOM emulator 204 and/or an ARINC ground system emulator. A message sent to the second port can be received by the VHF emulator 206 and/or an ARINC ground system emulator. A message sent to the third port can be received by the HF emulator 208 and/or an ARINC ground system emulator. Messages can be forwarded from any of the SATCOM emulator 204, the VHF emulator 206, the HF emulator 208, or any of the ARINC emulators to a terminator and reinitializor 210.

The terminator and reinitializor 210 can terminate a messaging session in which the terminator and reinitializor 210 receives a message from an emulator and create a new messaging session to a transmitter. For example, the terminator and reinitializor 210 can create a messaging session with the SATCOM transmitter 212 when the message was received at the first port. As another example, the terminator and reinitializor 210 can create a messaging session with the VHF transmitter 214 when the message was received at the second port. As yet another example, the terminator and reinitializor 210 can create a messaging session with the HF transmitter 216 when the message was received at the third port. In an embodiment, the terminator and reinitializor 210 can determine a priority of the message. The terminator and reinitializor 210 can select a transmitter based on the priority. The terminator and reinitializor 210 can create a messaging session to the selected transmitter. The message can be transmitted from the terminator and reinitializor 210 to a transmitted via the created messaging session. The SATCOM transmitter 212 can transmit the message to a SATCOM receiver 224 over an ARINC 741 network 218. The VHF transmitter 214 can transmit the message to a VHF receiver 226 over an ARINC 750 network 220. The HF transmitter 216 can transmit the message to a HF receiver 228 over an ARINC 753 network 222.

Figure 3:
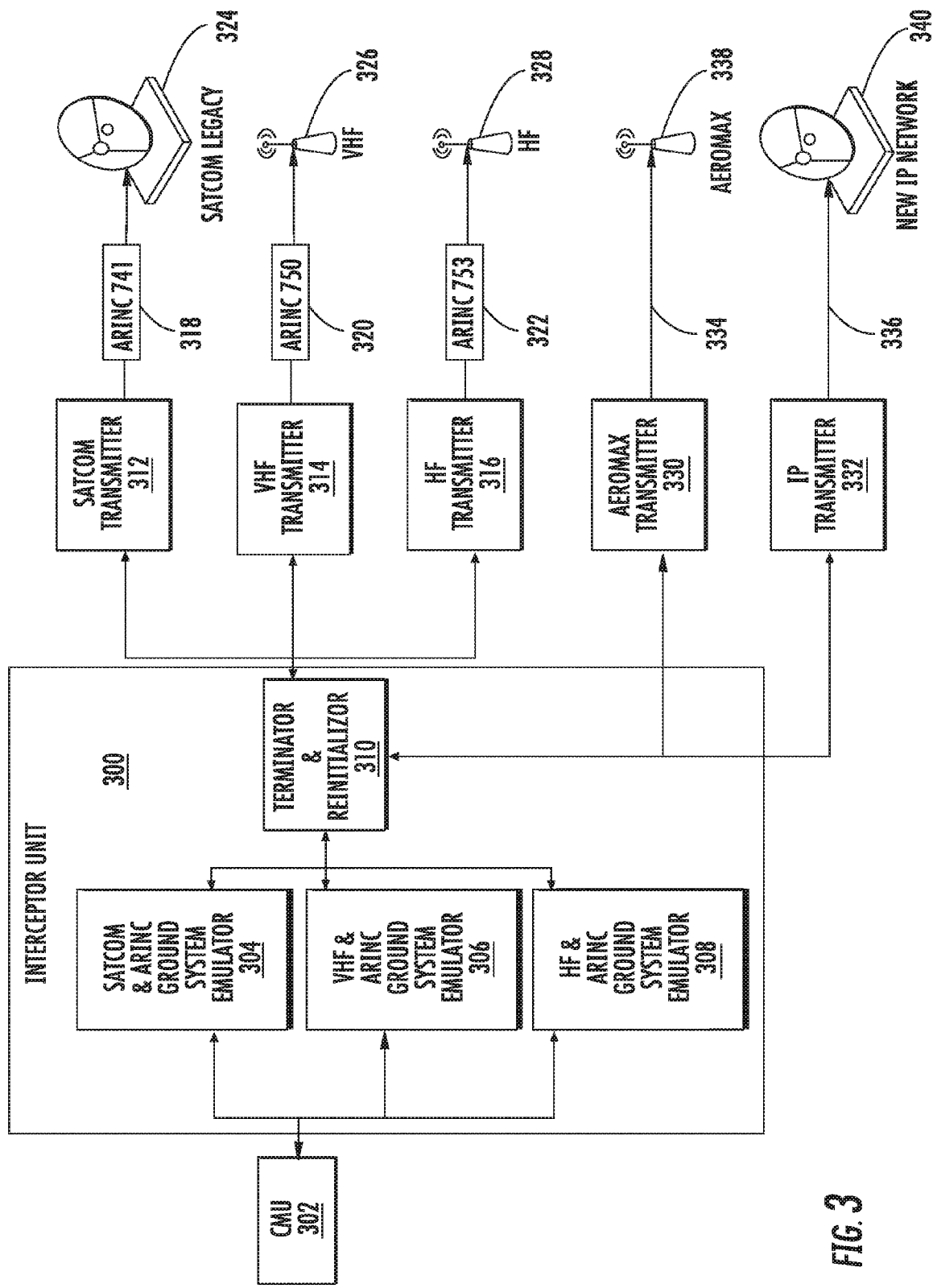
FIG. 3 depicts a block diagram according to example embodiments of the present disclosure.

FIG. 3 depicts a block diagram according to example embodiments of the present disclosure. A communication management unit (CMU) 302 can generate and/or transmit a message to a port associated with a particular transmitter. For example, a first port can be associated with a satellite communications (SATCOM) transmitter 312, a second port can be associated with a very high frequency (VHF) transmitter 314, and a third port can be associated with a high frequency (HF) transmitter 316. An interceptor unit 300 can intercept messages from the CMU 302 to the transmitters, such as the SATCOM transmitter 312, the VHF transmitter 314, or the HF transmitter 316. The interceptor unit 300 can include a SATCOM emulator 304, a VHF emulator 306, a HF emulator 308, and one or more aeronautical radio, incorporated (ARINC) ground system emulators. The SATCOM emulator 304 can be and/or include software that behaves like the SATCOM transmitter 312 from a perspective of the CMU 302. The VHF emulator 306 can be and/or include software that behaves like the VHF transmitter 314 from a perspective of the CMU 302. The HF emulator 308 can be and/or include software that behaves like the HF transmitter 316 from a perspective of the CMU 302. The one or more ARINC ground system emulators be and/or include software that behaves like an ARINC ground system from a perspective of the CMU 302.

A message sent to the first port can be received by a SATCOM emulator 304 and/or an aeronautical radio, incorporated (ARINC) ground system emulator. A message sent to the second port can be received by a VHF emulator 306 and/or an ARINC ground system emulator. A message sent to the third port can be received by a HF emulator 308 and/or an ARINC ground system emulator. Messages can be forwarded from any of the SATCOM emulator 304, the VHF emulator 306, the HF emulator 308, or any of the ARINC emulators to a terminator and reinitializor 310.

The terminator and reinitializor 310 can terminate a messaging session in which the terminator and reinitializor 310 receives a message from an emulator and create a new messaging session to a transmitter. For example, the terminator and reinitializor 310 can create a messaging session with the SATCOM transmitter 312 when the message was received at the first port. As another example, the terminator and reinitializor 310 can create a messaging session with the VHF transmitter 314 when the message was received at the second port. As yet another example, the terminator and reinitializor 310 can create a messaging session with the HF transmitter 316 when the message was received at the third port. In an embodiment, the terminator and reinitializor 310 can determine a priority of the message. The terminator and reinitializor 310 can select a transmitter based on the priority. The terminator and reinitializor 310 can select one of the transmitters that the CMU 302 is aware of (the SATCOM transmitter 312, the VHF transmitter 314, or the HF transmitter 316) or terminator and reinitializor 310 can select a transmitter that the CMU 302 is unaware of (AEROMAX transmitter 330 or Internet Protocol (IP) transmitter 332). The terminator and reinitializor 310 can create a messaging session to the selected transmitter. The message can be transmitted from the terminator and reinitializor 310 to a transmitted via the created messaging session. The SATCOM transmitter 312 can transmit the message to a SATCOM receiver 324 over an ARINC 741 network 318. The VHF transmitter 314 can transmit the message to a VHF receiver 326 over an ARINC 750 network 320. The HF transmitter 316 can transmit the message to a HF receiver 228 over an ARINC 753 network 322. The AEROMax transmitter 330 can transmit the message to an AEROMax receiver 338 over an AEROMax network 334. The IP transmitter 332 can transmit the message to an IP receiver 340 over an IP network 336.

Figure 4:
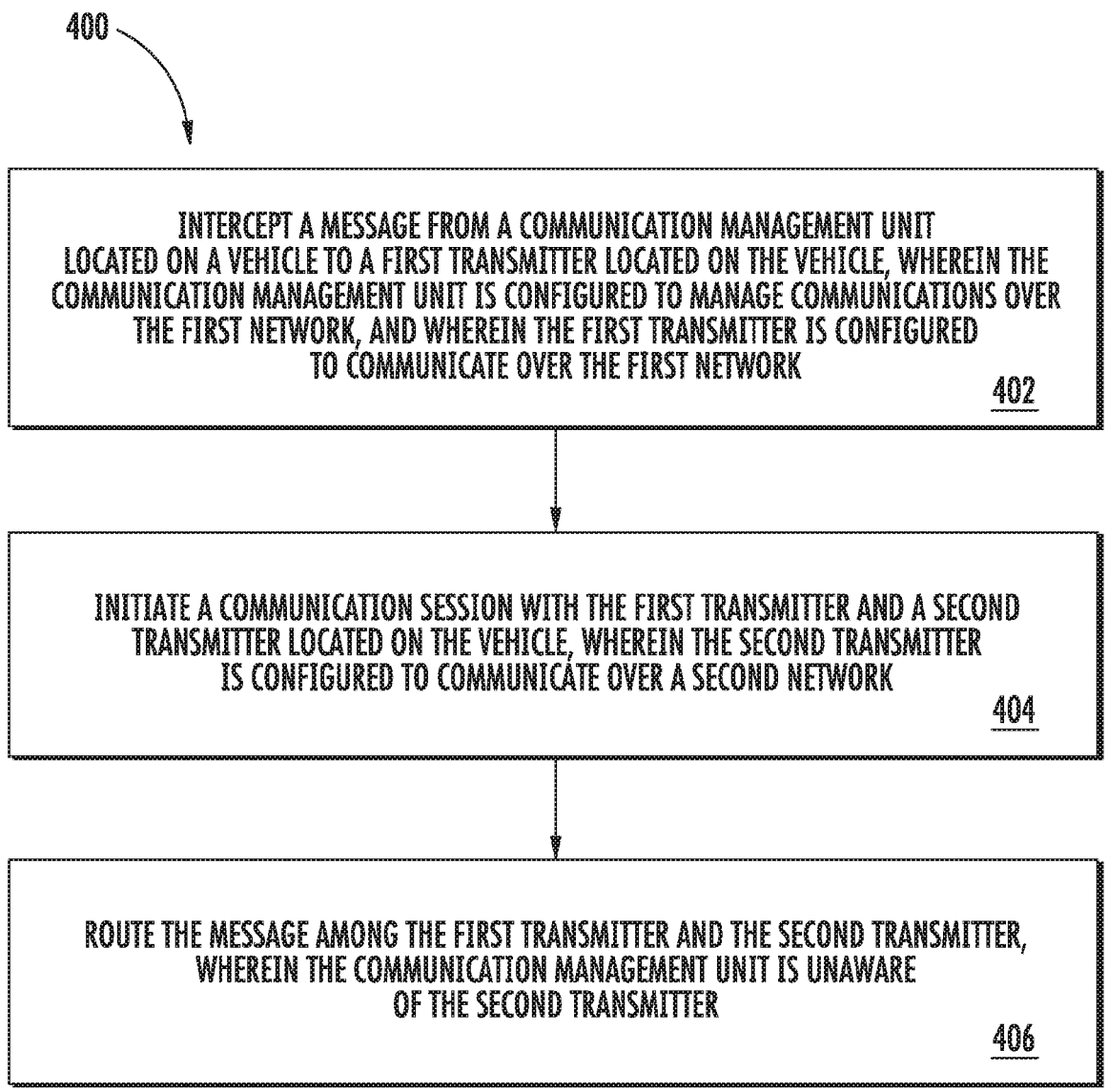
FIG. 4 depicts a flow diagram according to example embodiments of the present disclosure.

FIG. 4 depicts a flow diagram of an example method 400 for providing communication over a plurality of networks. The method of FIG. 4 can be implemented using, for instance, the one or more computing device(s) 902 and/or the one or more processor(s) 904 of the control system 900 of FIG. 9. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously, or modified in various ways without deviating from the scope of the present disclosure.

At (402), a message from a communication management unit to a first transmitter can be intercepted. For example, the one or more processor(s) 904 can intercept a message from a communication management unit to a first transmitter. The communication management unit can be configured to manage communications over the first network. The first transmitter can be configured to communicate over the first network. The communication management unit can be located on a vehicle. The first transmitter can be located on the vehicle.

At (404), a communication session with the first transmitter and a second transmitter can be initiated. For example, the one or more processor(s) 904 can initiate a communication session with the first transmitter and a second transmitter. The second transmitter can be configured to communicate over a second network. The second transmitter can be located on the vehicle. At (406), the message can be routed among the first transmitter and the second transmitter. For example, the one or more processor(s) 904 can route the message among the first transmitter and the second transmitter. The communication management unit is unaware of the second transmitter.

Figure 5:
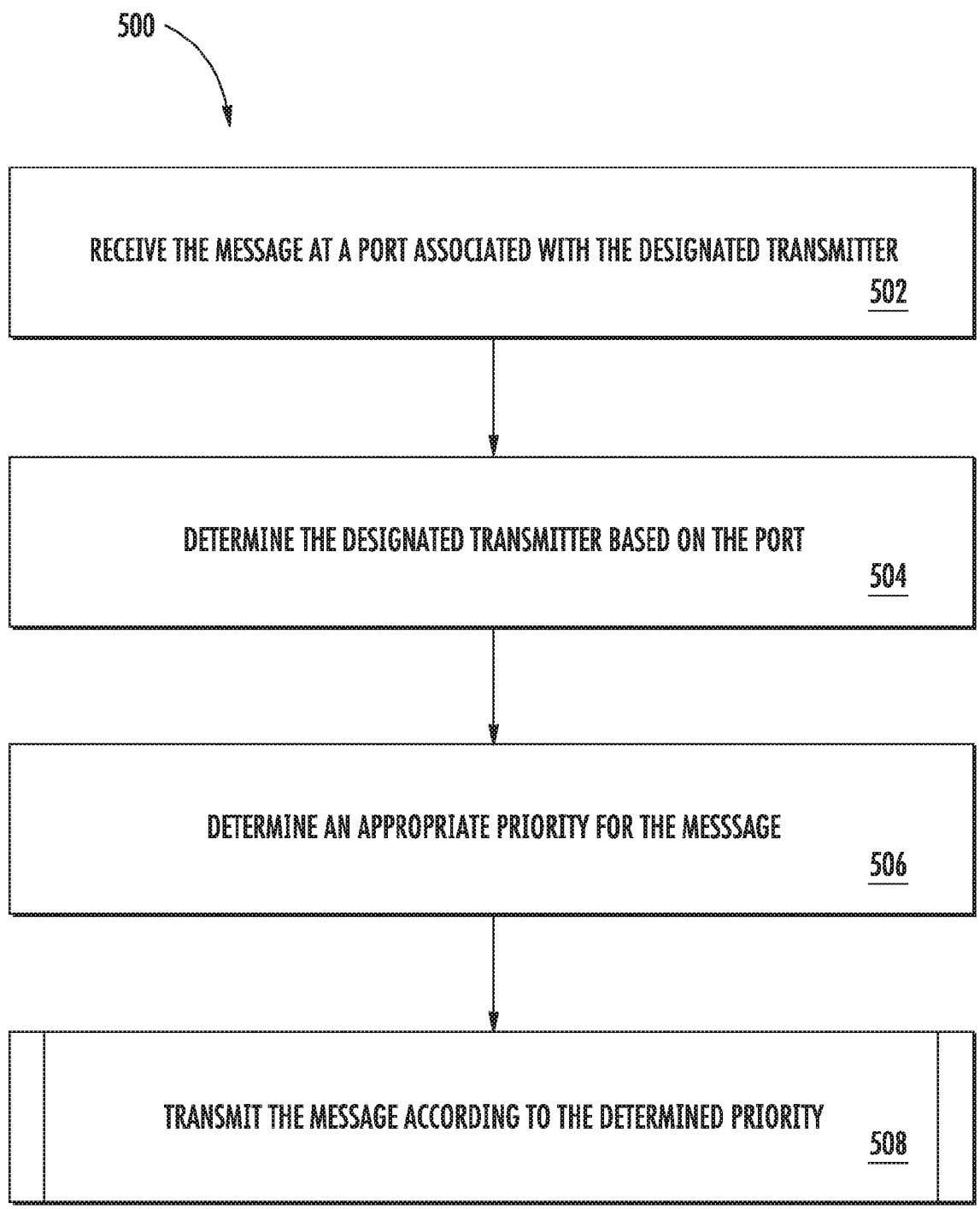
FIG. 5 depicts a flow diagram according to example embodiments of the present disclosure.

FIG. 5 depicts a flow diagram of an example method 500 for providing communication over a plurality of networks. The method of FIG. 5 can be implemented using, for instance, the one or more computing device(s) 902 and/or the one or more processor(s) 904 of the control system 900 of FIG. 9. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously, or modified in various ways without deviating from the scope of the present disclosure.

Optionally, the communication management unit can be further configured to designate the first transmitter as a transmitter of the message. At (502), the message can be received at a port associated with the designated transmitter. For example, the one or more processor(s) 904 can receive the message at a port associated with the designated transmitter. The message can be a message related to maintenance. The message can be a message intended for air traffic control. The first transmitter can include at least one of: a satellite communication transmitter, a very high frequency transmitter, or a high frequency transmitter. The second transmitter can include at least one of: a cellular transmitter, an AEROMax transmitter, or an internet protocol network transmitter.

At (504), the designated transmitter can be determined based on the port. For example, the one or more processor(s) 904 can determine the designated transmitter based on the port. As an example, the designated transmitter can be the satellite communication transmitter if the port is associated with the satellite communication transmitter. Similarly, the designated transmitter can be the very high frequency transmitter if the port is associated with the very high frequency transmitter. Similarly, the designated transmitter can be the high frequency transmitter if the port is associated with the high frequency transmitter. At (506), an appropriate priority for the message can be determined. For example, the one or more processor(s) 904 can determine an appropriate priority for the message. As an example, for the message related to maintenance, the determined priority can be low, not urgent, etc. As another example, for the message intended for air traffic control, the determined priority can be high, urgent, etc. In an embodiment, the appropriate priority can be determined based on the originator of the message. In an embodiment, the appropriate priority can be determined based on an intended recipient of the message.

Figure 6:
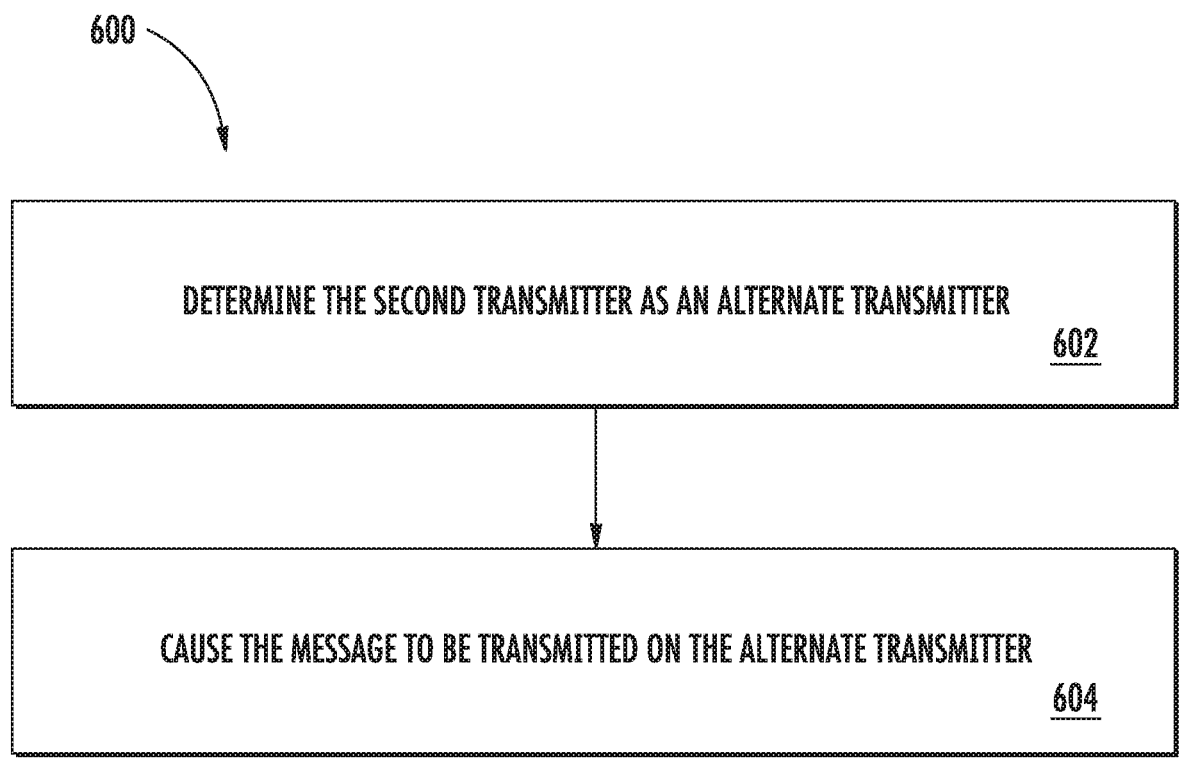
FIG. 6 depicts a flow diagram according to example embodiments of the present disclosure.
Figure 7:
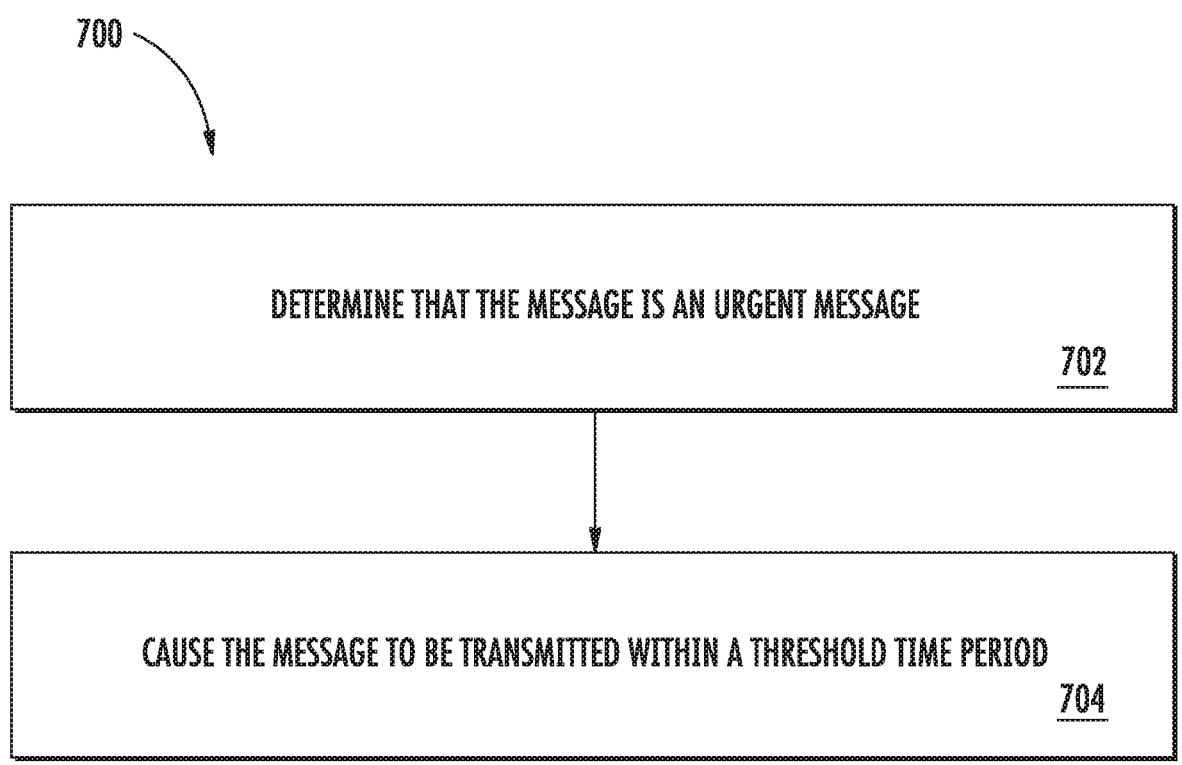
FIG. 7 depicts a flow diagram according to example embodiments of the present disclosure.
Figure 8:
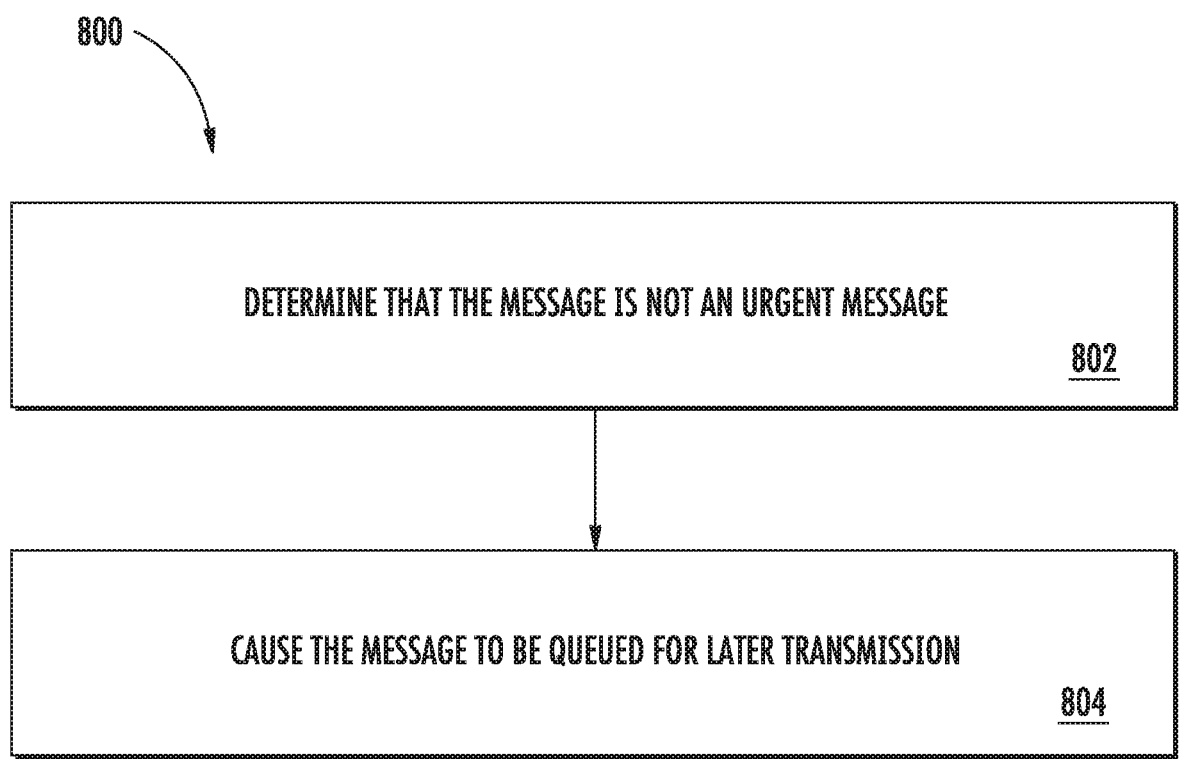
FIG. 8 depicts a flow diagram according to example embodiments of the present disclosure.

At (508), the message can be transmitted according to the determined priority. For example, the one or more processor(s) 904 can transmit the message according to the determined priority. For instance, for a low priority message/not urgent message, a most cost effective network and/or a most cost effective time and/or location can be selected for transmission. In another instance, for a high priority message/urgent message, a most reliable network can be selected for transmission. FIGS. 6-8 illustrate example methods for transmitting the message according to the determined priority.

FIG. 6 depicts a flow diagram of an example method 600 for transmitting the message according to the determined priority. The method of FIG. 6 can be implemented using, for instance, the one or more computing device(s) 902 and/or the one or more processor(s) 904 of the control system 900 of FIG. 9. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously, or modified in various ways without deviating from the scope of the present disclosure.

At (602), the second transmitter can be determined as an alternate transmitter. For example, the one or more processor(s) 904 can determine the second transmitter as an alternate transmitter. The message can be caused to be transmitted on the alternate transmitter. For example, the one or more processor(s) 904 can cause the message to be transmitted on the alternate transmitter.

FIG. 7 depicts a flow diagram of an example method 700 for transmitting the message according to the determined priority. The method of FIG. 7 can be implemented using, for instance, the one or more computing device(s) 902 and/or the one or more processor(s) 904 of the control system 900 of FIG. 9. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously, or modified in various ways without deviating from the scope of the present disclosure.

At (702), a determination can be made that the message is an urgent message. For example, the one or more processor(s) 904 can determine that the message is an urgent message. At (704), the message can be caused to be transmitted within a threshold time period. For example, the one or more processor(s) 904 can cause the message to be transmitted within a threshold time period. The threshold time period can be any value. For example, the threshold time period can be 10 milliseconds. As another example, the threshold time period can be 100 milliseconds. As yet another example, the threshold time period can be 1 second. The examples of threshold time periods are given as an example and not meant to be limiting.

FIG. 8 depicts a flow diagram of an example method 800 for transmitting the message according to the determined priority. The method of FIG. 5 can be implemented using, for instance, the one or more computing device(s) 902 and/or the one or more processor(s) 904 of the control system 900 of FIG. 9. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously, or modified in various ways without deviating from the scope of the present disclosure.

At (802), a determination can be made that the message is not an urgent message. For example, the one or more processor(s) 904 can determine that the message is not an urgent message. At (804), the message can be caused to be queued for later transmission. For example, the one or more processor(s) 904 can cause the message to be queued for later transmission.

Figure 9:
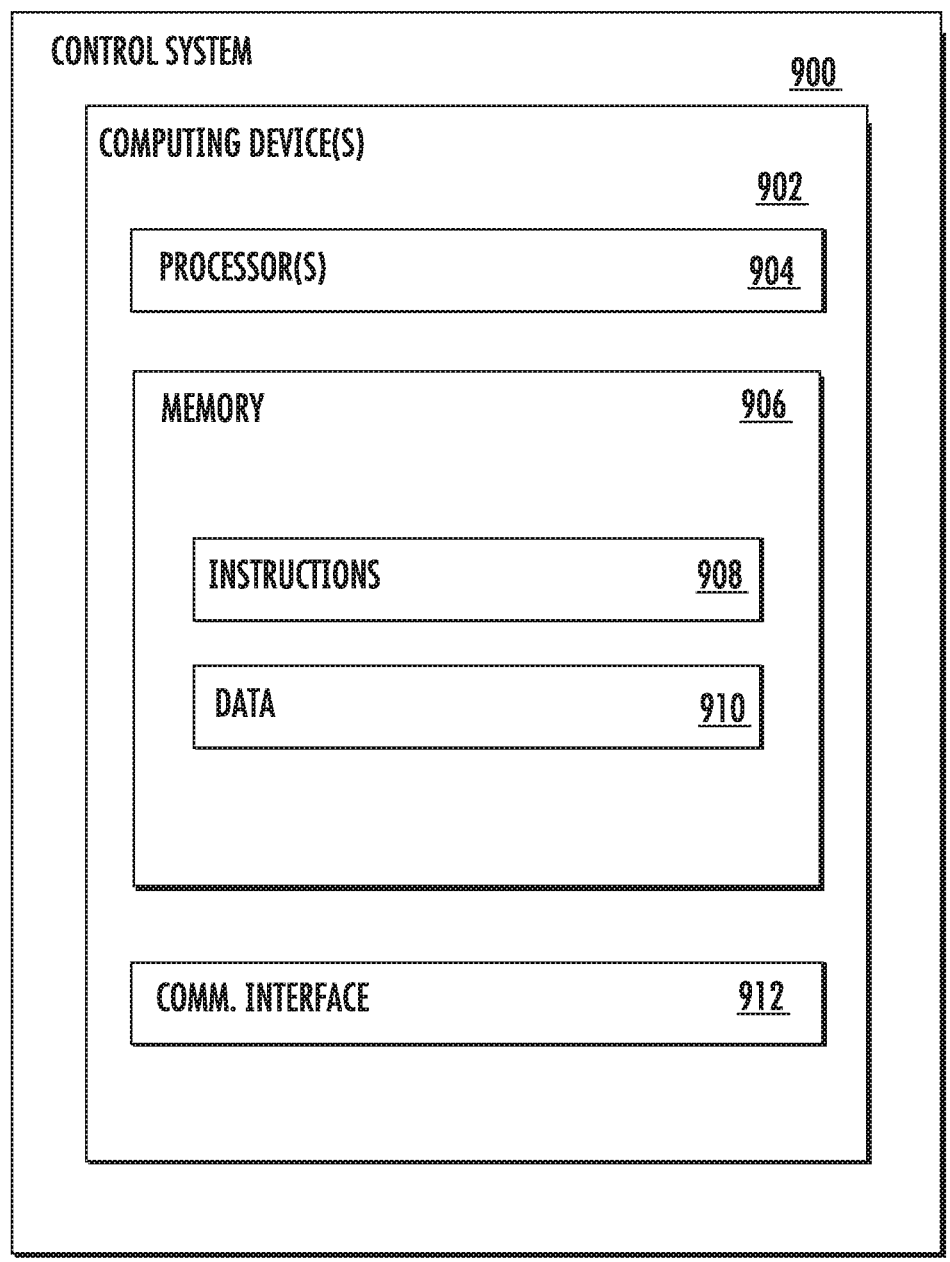
FIG. 9 depicts a control system for implementing one or more aspects according to example embodiments of the present disclosure.

FIG. 9 depicts a block diagram of an example control system 900 that can be used to implement methods and systems according to example embodiments of the present disclosure. The control system 900 can be any control device or system described with reference to FIG. 1. As shown, the control system 900 can include one or more computing device(s) 902. The one or more computing device(s) 902 can include one or more processor(s) 904 and one or more memory device(s) 906. The one or more processor(s) 904 can include any suitable processing device, such as a microprocessor, microcontroller, integrated circuit, logic device, or other suitable processing device. The one or more memory device(s) 906 can include one or more computer-readable media, including, but not limited to, non-transitory computer-readable media, RAM, ROM, hard drives, flash drives, or other memory devices.

The one or more memory device(s) 906 can store information accessible by the one or more processor(s) 904, including computer-readable instructions 908 that can be executed by the one or more processor(s) 904. The instructions 908 can be any set of instructions that when executed by the one or more processor(s) 904, cause the one or more processor(s) 904 to perform operations. The instructions 908 can be software written in any suitable programming language or can be implemented in hardware. In some embodiments, the instructions 908 can be executed by the one or more processor(s) 904 to cause the one or more processor(s) 904 to perform operations, such as the operations for providing communication over a plurality of networks, as described with reference to FIG. 4.

The memory device(s) 906 can further store data 910 that can be accessed by the one or more processor(s) 904. For example, the data 910 can include any data used for providing communication over a plurality of networks, as described herein. The data 910 can include one or more table(s), function(s), algorithm(s), model(s), equation(s), etc. for providing communication over a plurality of networks according to example embodiments of the present disclosure.

The one or more computing device(s) 902 can also include a communication interface 912 used to communicate, for example, with the other components of system. The communication interface 912 can include any suitable components for interfacing with one or more network(s), including for example, transmitters, receivers, ports, controllers, antennas, or other suitable components.

Figure 10:
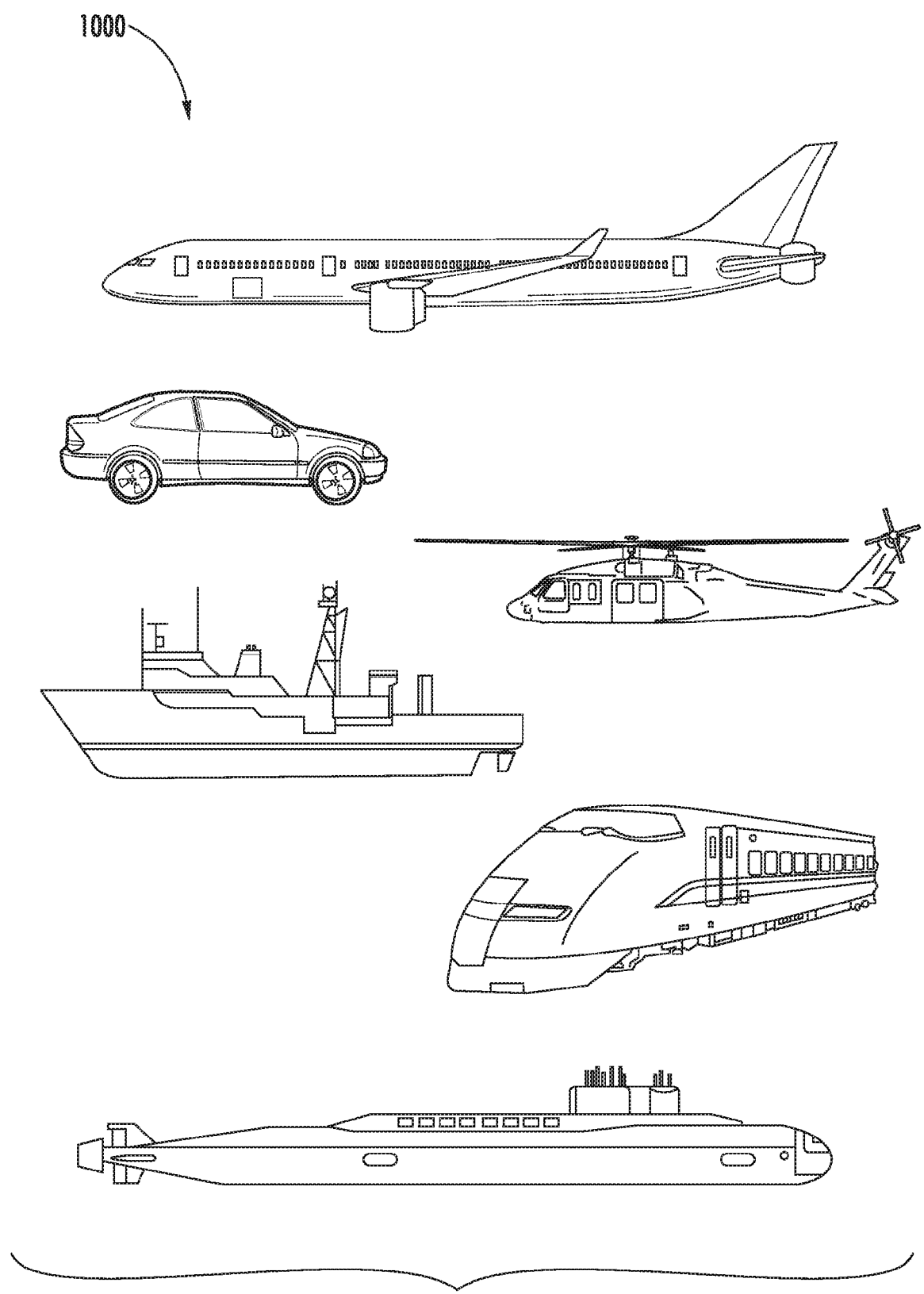
FIG. 10 depicts example vehicles according to example embodiments of the present disclosure.

Referring now to FIG. 10, example vehicles 1000 according to example embodiments of the present disclosure are depicted. The systems and methods of the present disclosure can be implemented on an aerial vehicle, helicopter, automobile, boat, submarine, train, and/or any other suitable vehicles. While the present disclosure is described herein with reference to an aerial vehicle implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing communication over a plurality of networks comprising:
   a first transmitter located on a vehicle configured to communicate over a first network;
   a second transmitter located on the vehicle configured to communicate over a second network;
   a communication management unit located on the vehicle configured to manage communications over the first network; and
   an interceptor unit located on the vehicle comprising one or more processors configured to:
   intercept a message from the communication management unit;

initiate a communication session with the first transmitter and the second transmitter; and
route the message among the first transmitter and the second transmitter,
wherein the communication management unit is unaware of the second transmitter.

2. The system of claim 1, wherein the communication management unit is further configured to designate the first transmitter as a transmitter of the message; and
wherein the one or more processors of the interceptor unit are further configured to:
receive the message at a port associated with a designated transmitter;
determine the designated transmitter based on the port;
determine an appropriate priority for the message; and
transmit the message according to the determined priority.

3. The system of claim 2, wherein the one or more processors of the interceptor unit are further configured to transmit the message according to the determined priority by:
determine the second transmitter as an alternate transmitter; and
cause the message to be transmitted on the alternate transmitter.

4. The system of claim 2, wherein the one or more processors of the interceptor unit are further configured to transmit the message according to the determined priority by:
determine that the message is an urgent message; and
cause the message to be transmitted within a threshold time period.

5. The system of claim 4, wherein the message is a message intended for air traffic control.

6. The system of claim 2, wherein the one or more processors of the interceptor unit are further configured to transmit the message according to the determined priority by:
determine that the message is not an urgent message; and
cause the message to be queued for later transmission.

7. The system of claim 6, wherein the message is a message related to maintenance.

8. The system of claim 1, wherein the first transmitter comprises at least one of a satellite communication transmitter, a very high frequency transmitter, or a high frequency transmitter.

9. The system of claim 1, wherein the interceptor unit comprises one or more emulators, a terminator, and a reinitializor.

10. A method for providing communication over a plurality of networks comprising:
intercepting, by one or more computing devices located on a vehicle, a message from a communication management unit located on the vehicle to a first transmitter located on the vehicle, wherein the communication management unit is configured to manage communications over the first network, and wherein the first transmitter is configured to communicate over the first network;
initiating, by the one or more computing devices, a communication session with the first transmitter and a second transmitter located on the vehicle, wherein the second transmitter is configured to communicate over a second network; and
routing, by the one or more computing devices, the message among the first transmitter and the second transmitter,
wherein the communication management unit is unaware of the second transmitter.

11. The method of claim 10, wherein the communication management unit is further configured to designate the first transmitter as a transmitter of the message and further comprising:
receiving, by the one or more computing devices, the message at a port associated with the designated transmitter;
determining, by the one or more computing device, the designated transmitter based on the port;
determining, by the one or more computing device, an appropriate priority for the message, and
transmitting, by the one or more computing device, the message according to the determined priority.

12. The method of claim 11, wherein transmitting, by the one or more computing devices, the message according to the determined priority further comprises:
determining, by the one or more computing devices, the second transmitter as an alternate transmitter; and
causing, by the one or more computing devices, the message to be transmitted on the alternate transmitter.

13. The method of claim 11, wherein transmitting, by the one or more computing devices, the message according to the determined priority further comprises:
determining, by the one or more computing devices, that the message is an urgent message; and
causing, by the one or more computing devices, the message to be transmitted within a threshold time period.

14. The method of claim 13, wherein the message is a message intended for air traffic control.

15. The method of claim 11, wherein transmitting, by the one or more computing devices, the message according to the determined priority further comprises:
determining, by the one or more computing devices, that the message is not an urgent message; and
causing, by the one or more computing devices, the message to be queued for later transmission.

16. The method of claim 15, wherein the message is a message related to maintenance.

17. The method of claim 10, wherein the first transmitter comprises at least one of a satellite communication transmitter, a very high frequency transmitter, or a high frequency transmitter.

18. The system of claim 10, wherein the second transmitter is at least one of a cellular transmitter, an AEROMax transmitter, or an internet protocol network transmitter.

19. An aerial vehicle comprising:
a first transmitter configured to communicate over a first network;
a second transmitter configured to communicate over a second network;
a communication management unit configured to manage communications over the first network; and
an interceptor unit comprising one or more processors configured to:
intercept a message from the communication management unit;
initiate a communication session with the first transmitter and the second transmitter; and
route the message among the first transmitter and the second transmitter,
wherein the communication management unit is unaware of the second transmitter.

20. The aerial vehicle of claim 19, wherein the communication management unit is further configured to designate the first transmitter as a transmitter of the message; and
  wherein the one or more processors of the interceptor unit are further configured to:
    receive the message at a port associated with the designated transmitter;
    determine the designated transmitter based on the port;
    determine an appropriate priority for the message; and
    transmit the message according to the determined priority.

* * * * *